United States Patent Office 3,812,009
Patented May 21, 1974

3,812,009
STEREOSPECIFIC PROCESS FOR THE PREPARATION OF L-3,4-DIHYDROXYPHENYLALANINE (L-DOPA) AND ANALOGS THEREOF
Frank E. Semersky, Oregon, Ohio, assignor to Owens-Illinois, Inc.
No Drawing. Filed Jan. 10, 1972, Ser. No. 216,796
Int. Cl. C12d 1/00
U.S. Cl. 195—29                 6 Claims

ABSTRACT OF THE DISCLOSURE

Stereospecific process for the preparation of L-3,4-dihydroxyphenylalanine and N-derivatives thereof from substrate materials by enzymatic oxidation of said substrate materials with insolubilized tyrosinase followed by reduction and hydrolysis of the oxidation products as needed. The substrate materials which can be used in the process of this invention can be L-tyrosine and certain N-derivatives thereof. Ordinarily, the biocatalytic oxidation of these substrate materials will generally yield an oxidation product consisting essentially of either the corresponding o-dihydric compound of the substrate material or the corresponding o-quinone of this substrate material and mixtures thereof. Since tyrosinase is capable of biocatalytic oxidation of these o-dihydric compounds, the supernatant containing these oxidation products is separated from the tyrosinase in order to prevent further oxidation of these compounds and especially prior to reduction of more completely oxidized substrate materials to the o-dihydric form. In certain limited instances, for example, where N-acetyl-L-tyrosine is the substrate material, the hydrolysis of N-acetyl-L-3,4-dihydroxyphenylalanine to L-Dopa can be accomplished enzymatically through the contacting of the N-substituted compound with either carboxypeptidase A or acylase. The L-3,4-dihydroxyphenylalanine thus prepared has therapeutic value in the treatment of Parkinson's disease, and other diseases of the central nervous system.

BACKGROUND OF THE INVENTION

Field of the invention

This invention relates to a stereospecific process for the preparation of L-3,4-dihydroxyphenylalanine and N-derivatives thereof. More specifically, this process enables the directive synthesis of L-3,4-dihydroxyphenylalanine and compounds that can be easily converted to L-3,4-dihydroxyphenylalanine devoid of the by-products and racemic mixtures associated with traditional methods of preparation of this compound.

Description of the prior art

With the discovery of the therapeutic value of L-Dopa in the treatment of Parkinson's disease, there has arisen an urgent need for an economical process to meet the demand for this compound, Catzias et al., New Engl. J. Med. 280, 377 (1969). Attempts to prepare L-Dopa by synthetic techniques ordinarily result in the production of many undesirable side reaction-products and a racemic mixture containing both the D and L isomers of 3,4-dihydroxyphenylalanine. Because of the nondirectivity of such syntheses and the relative impurity of the product produced, elaborate techniques are required for separation and/or resolution of the racemic mixtures containing both these isomers and for the removal of the other by-products of the reaction, thereby substantially increasing the time, the number of steps and thus the cost of producing this compound.

In order to avoid the problems associated with the organic synthesis of compounds such as L-Dopa, research efforts in more recent years have attempted to adapt a variety of natural enzyme systems to industrial processes, in order to attain more optically pure products.

One of the earlier attempts to adapt a natural enzyme to the preparation of L-3,4-dihydroxyphenylalanine involved the resolution of racemic N-acetyl, methylene dioxy derivatives of tyrosine (prepared by synthetic techniques) into the corresponding D+L isomers with the enzyme, takadiastase, Yamada et al., Chem. Pharm. Bul. 10, 693 (1962).

More recently, in anticipation of this enormous therapeutic need for L-Dopa, a study was undertaken in search of a facile microbiological method for the preparation of L-Dopa from L-tyrosine, Sih et al., J. Am. Chem. Soc. 91, 6204 (1969). A survey of the relevant technical literature, disclosed that microorganisms, which are capable of metabolism of L-tyrosine, decompose L-tyrosine readily to yield p-hydroxyphenylpyruvic, p-coumaric, or homogentisic acids. Although protocatechuic acid and catechol were also identifiable as metabolites of L-tyrosine, no L-Dopa was detected, suggesting microbial deamination of the L-tyrosine during the initial stages of metabolism. Sih and his associates, working under the assumption that deamination and aromatic hydroxylation of L-tyrosine occur independently, successfully selectively inhibited deamination of the L-tyrosine by the introduction of suitable N-blocking groups (N-carbobenzoxy, N-formyl, or N-butoxycarbonyl) groups onto the substrate prior to incubation of this compound with the specific microorganism, thereby enabling the accumulation of the desired N-substituted L-Dopa derivatives.

Attempts to prepare L-Dopa from L-tyrosine by biocatalytic oxidation of an L-tyrosine substrate with tyrosinase insolubilized on a cellulosic support material have achieved only marginal success, Wykes et al., Nature 230, 187 (1970). Tyrosinase insolubilized in this manner, according to Wykes' article, proved to be unstable, losing about 75% of its original activity during a twenty-four hour period under the reported reaction conditions.

In summary, none of the prior art systems described above provide an economic route for the directive synthesis of L-Dopa from inexpensive starting materials sufficient to meet the anticipated demand for this compound created by anticipated wide spread use of this therapeutic agent in the treatment of Parkinson's disease.

SUMMARY OF THE INVENTION

My invention is a stereospecific process for the preparation of L-3,4-dihydroxyphenylalanine and N-derivatives thereof comprising contacting a substrate material of the formula

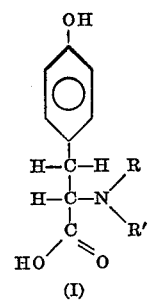

(I)

wherein

R and R' are selected from the group consisting of hydrogen,

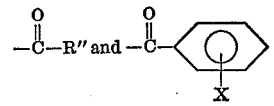

where R″ is hydrogen alkyl of 1 to 3 carbon atoms or halo substituted alkyl of 1 to 3 carbon atoms; and X is hydrogen or halogen;

with the proviso that where one of R or R′ is

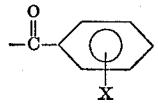

the other is hydrogen or

with insolubilized tyrosinase in a reaction medium having a pH in the range of from about 4.8 to about 7.3 and a temperature in the range of from about 4 to about 40° C. until substantially all the substrate material has been oxidized, forming an oxidation product consisting essentially of either the corresponding o-dihydric compound of the substrate material or the corresponding o-quinone of the substrate material and mixtures thereof. After substantially all the substrate material has been oxidized to at least its corresponding o-dihydric form the insolubilized tyrosinase is separated from the reaction medium containing said oxidation product. Once the insolubilized tyrosinase is removed from the reaction medium, that substrate material, having undergone more complete oxidation to the corresponding o-quinone, is reduced back to the corresponding o-dihydric compound.

In the event that an N-derivative of L-3,4-dihydroxyphenylalanine is used as the substrate material, its corresponding o-dihydric compound can be readily converted to L-3,4-dihydroxyphenylalanine by hydrolysis of the N-substituent present thereon. In one of the preferred embodiments of this invention the substrate material is the N-blocked L-tyrosine derivative, N-acetyl-L-tyrosine.

Where N-blocked-L-tyrosine derivatives are used as the substrate materials of the process of this invention, hydrolysis of such N-substituents can be carried out by either synthetic or enzymatic means (in a few limited instances). For example, when N-acetyl-L-tyrosine is the substrate material, its corresponding o-dihydric compound, N-acetyl-L-3,4-dihydroxyphenylalanine, can be hydrolyzed enzymatically by adjusting the pH of the reaction medium containing this compound to neutrality and then contacting this compound with either carboxypeptidase A or acylase.

DESCRIPTION OF THE INVENTION INCLUDING PREFERRED EMBODIMENTS

Preparation of immobilized enzyme

*Enzyme.*—Tyrosinase (also commonly referred to as polyphenol oxidase) is a copper containing enzyme widely distributed in both plants and animals including man. The activity of this enzyme is believed to have been first observed in the mid-nineteenth century when Schoenbein first pointed out the presence of "an oxygen activating agent" in the mushroom, *Boletus luridus*, which was capable of the aerobic oxidation of certain materials in this plant, resulting in the development of blue pigmentation upon the plant reaching maturity, Phil. Mag. *11*, 137 (1856). This oxygen activating agent was subsequently isolated and found to be specific for the oxidation of the substrate, tyrosine, as well as the aerobic oxidation of various other aromatic monohydric phenols, e.g. cresol, phenol, p-hydroxyphenylamine, p-hydroxyphenyl propionic acid and p-hydroxyphenyl acetic acid.

In the natural state, tyrosinase is found to be present in systems also containing other phenol oxidases, peroxidases and catalases etc., some of which are believed to influence or modify its enzymatic action.

In addition to tyrosinase being capable of catalyzing the aerobic oxidation of many monohydric phenols, it has also demonstrated oxidative specificity toward a number of o-dihydric phenols, e.g. catechol. Tyrosinase is, therefore, unique in this regard from other phenol oxidases in that it has the ability to catalyze two essentially different oxidations; the insertion of a hydroxyl group in a monohydric phenol ortho to one that is already present and the oxidation of many o-dihydric phenols to their corresponding o-quinones. The kinetics of biocatalytic oxidation of monohydric phenols with tyrosinase is also unusual in the sense that tyrosinase is most active toward monohydric phenols when it is simultaneously catalyzing the oxidation of a catechol type substrate. This simultaneous oxidation of catechol in the reaction mixture apparently promotes cresolase activity of the tyrosinase, resulting in an acceleration in the rate of oxidation of the phenolic substrate materials to their corresponding o-dihydric compound. In order to shorten the induction period characteristics of this type of reaction and thereby advance the time when the tyrosinase reaches its equilibrium rate of oxidation of substrate materials, catechol-type compounds can be added to the reaction medium to assist in promoting cresolase activity to the tyrosinase.

The rate of enzymatic conversion of substrate materials and the length of the induction period is also dependent upon the activity of the tyrosinase and concentration of substrate materials present in the reaction medium.

Ordinarily, the specific activity of tyrosinase will vary with the source of the enzyme and the methods employed in extraction and purification. The dual activity of the enzyme is also variable with respect to its ability to catalyze insertion of a hydroxyl group into a monohydric phenol ortho to one that is already present (so-called cresolase activity) and the oxidation of o-dihydric phenols to their corresponding o-quinones (so-called catecholase activity) in that the enzyme will ordinarily possess greater catecholase activity than cresolase activity. This disparity in relative catecholase/cresolase activity is believed to be due, in part, to the methods used in extraction and purification of the enzyme. Tyrosinase having a relative catecholase/cresolase activity ratio ranging anywhere from about 2:1 to about 30:1 is not at all uncommon. In the preferred embodiments of this invention, the purified tyrosinase biocatalyst should have a relative catecholase/cresolase ratio as low as practically possible in order to minimize the oxidation of the substrate materials to the corresponding o-quinone.

Tyrosinase, as previously indicated, is present in most animal and plant tissue and therefore can be readily attainable from a variety of sources by adaptation of standard extraction and purification techniques; one such technique being disclosed in U.S. Pat. 2,956,929.

Naturally occurring material which is generally regarded as possibly the best and most convenient source of tyrosinase is the mushroom (e.g. *Psalliota campestris*)—although tyrosinase is also present in appreciable concentrations in Idaho potatoes, yams, cuttlefish ink sacs and arthropod blood. Tyrosinase can also be obtained commercially, either as a crude lyophilized powder or in the highly purified state.

*Insolubilizing medium.*—In order for the highly water soluble tyrosinase to be easily separated from the reaction mass after conversion of the substrate material to its corresponding oxidation product, it must be insolubilized. The agent used to render the enzyme insoluble must be capable of performing this function without substantial reduction of the biocatalytic potency of the enzyme and yet be compatible with the other reagents and products of this process.

Ordinarily, such insolubilizing agent can be a synthetic or natural polymer or an inorganic material, such as an organofunctional silane modified silica.

Two of the mechanisms commonly used in insolubilization of enzymes with such materials are (a) entrapment of the enzyme in a polymer hydrogel and (b) covalent bonding of the enzyme to a carrier material. In a typical entrapment type situation, the tyrosinase is added to a monomer suspension and the monomer, polymerized to form a hydrogel. As the monomer is polymerized, the large proteinaceous tyrosinase molecules dissolved and/or suspended in the polymerization medium become entrapped within the interstices of the hydrogel. Typical of the monomers which have been traditionally used in the formation of these hydrogels is acrylamide. Covalent bonding of the enzyme to an insoluble carrier material, on the other hand, involves actual chemical interaction between the enzyme and the carrier material yielding an insoluble enzyme carrier complex.

*Substrate.*—The substrate material that can be used in the process of this invention can be L-tyrosine or any one of a number of N-blocked L-tyrosine derivatives of the formula

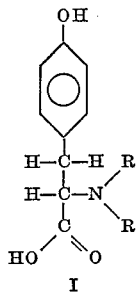

wherein

R and R' are independently selected from the group consisting of hydrogen,

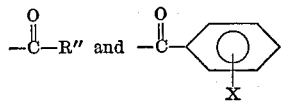

where R" is hydrogen, alkyl of 1 to 3 carbon atoms, or a halo-substituted alkyl of 1 to 3 carbon atoms; and X is hydrogen or halogen;

with the proviso, that when one of R or R' is

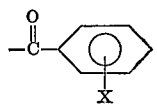

the other is hydrogen or

Representative of the substrate material of the above formula which can be used in the process of this invention in the synthesis of L-3,4-dihydroxyphenylalanine and N-derivatives thereof are L-tyrosine, N-acetyl-L-tyrosine, N-formyl-L-tyrosine, N-propionyl-L-tyrosine, N-monofluoroacetyl-L-tyrosine, N-monochloroacetyl-L-tyrosine, N-dichloroacetyl-L-tyrosine, N-trichloroacetyl-L-tyrosine, N-chloropropionyl-L-tyrosine, N-benzoyl-L-tyrosine, and N-(p-chlorobenzoyl)-L-tyrosine.

Ordinarily, where a substrate material, such as L-tyrosine, undergoes biocatalytic oxidation with tyrosinase, a substantial fraction of the substrate is converted to the corresponding o-quinone. This type of enzymatic oxidation of L-tyrosine also activates other sites on the aromatic ring of the corresponding o-quinone molecule which can result in the cyclization of the corresponding o-quinone (Dopachrome) and/or polymerization (Melanin) with other similarly activated molecules. With the introduction of N-blocking groups onto the substrate molecules, further reaction of the activated sites on the aromatic ring of the substrate with other functional groups on the molecule or with other similarly activated molecules is retarded until the corresponding o-quinone of L-tyrosine can be further converted by reduction to the less reactive o-dihydric compound; and, therefore, the use of such N-blocked L-tyrosine substrate is preferred.

PROCESS

In brief, the process of this invention involves the enzymatic oxidation of L-tyrosine or an N-substituted derivative thereof with insolubilized tyrosine followed by subsequent reduction and hydrolysis of the resultant oxidation products where necessary. The following series of equations are illustrative of the process of this invention.

Equation A (oxidation)

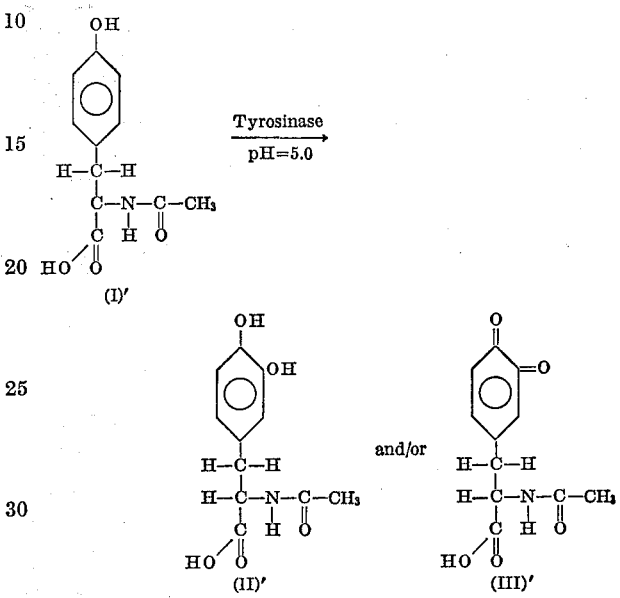

Equation B (reduction)

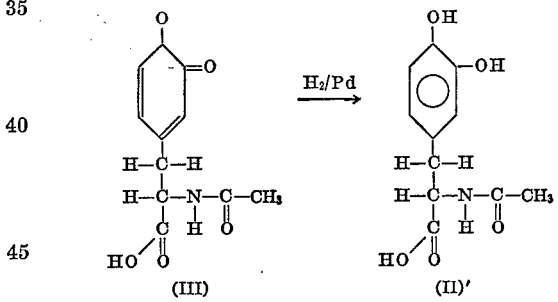

Equation C (hydrolysis)

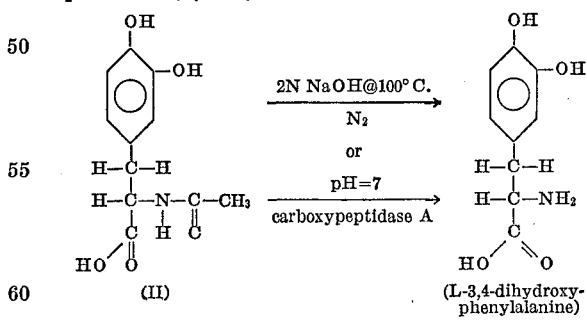

The reaction medium within which the above series of steps are carried out can be any vehicle capable of dissolving the reagents and products of this process without rendering the insolubilized tyrosinase inactive or otherwise retarding or inhibiting its activity. Good results can be obtained where water, mixtures of water and lower alkyl alcohols or other standard solvents are used as a vehicle for the carrying forward of these reactions.

The order of addition of the reactants to the reaction medium does not appear to be of critical importance; however, it is generally preferable to dissolve the substrate material in the reaction medium prior to exposure to enzymatic oxidation with insolubilized tyrosinase. The process of this invention does not appear to be affected by varying the concentration of substrate materials relative to the concentration of insolubilized tyrosinase in the reaction medium.

Prior to the addition of the insolubilized tyrosinase to the reaction medium, the pH of the reaction medium should be carefully adjusted with buffer in order to insure against denaturation or inactivation of the enzyme. The enzymatic oxidation of substrate materials with insolubilized tyrosinase proceeds very well within a pH range of from about 4.8 to about 7.3 and, therefore, the pH of the reaction medium should be adjusted accordingly. Buffers typical of those which can be used for the maintenance of pH stability within this range are aconitate, citrate, acetate, citrate-phosphate, succinate, phthalate, maleate, cacodylate, TRIS or any of a number of the so called "Good" buffers such as HEPES (N-2-hydroxyethylpiperazine-N'-2-ethanesulfonic acid), MES (2-[N-morpholino] ethane sulfonic acid, TES (N-tris[hydroxymethyl] methyl-2-aminoethane sulfonic acid, MOPS (morpholinopropane sulfonic acid) and PIPES (piperazine-N, N'-bis-[2-ethane-sulfonic acid]).

The temperature of the reaction medium should also be carefully monitored in order to control the rate of conversion of substrate materials by the insolubilized tyrosinase; to prevent denaturation of the insolubilized tyrosinase; and to prevent autocatalytic cyclization and/or polymerization of the more highly reactive oxidation products of the process. Generally, maintenance of the temperature below 40° C. will achieve the first two of the above-enumerated objectives, while most efficient prevention of the further reaction of the products of biocatalytic oxidation requires maintenance of the reaction environment at room temperature (~20° C.) or slightly below.

After the substrate and insolubilized tyrosinase are added to the reaction medium in the appropriate proportions, the system is mildly agitated until the desired degree of conversion of substrate has occurred. The conversion of substrate is arrested by the separation of the insolubilized tyrosinase from reaction medium containing substrate oxidation products by decantation, filtration, centrifugation, or other standard techniques.

Once the tyrosinase has been separated from the reaction system, the oxidation products of the prior step are reduced, to the extent necessary, to the corresponding o-dihydric compound by the addition of any one of a number of standard reducing agents to the reaction medium. Representative of such agents which have been found useful in this regard are $H_2O_2$; $Fe(NH_4)_2(SO_4)_2$; $Na_2S_2O_4$; $H_2$ over platinum; $H_2$ over palladium; and $NaBH_4$. The pH of the reaction medium may also influence the degree and efficiency reduction of the substrate oxidation products by these agents; most efficient conversion of these oxidation products to the corresponding o-dihydric compound being observed at about pH 5.

Where N-blocked L-tyrosinase derivatives are the substrate materials, conversion of an N-substituted L-3,4-dihydroxyphenylalanine compound to L-3,4-dihydroxyphenylalanine can be accomplished by standard synthetic hydrolysis or (in certain limited instances) enzymatic hydrolysis techniques. Enzymatic hydrolysis of the N-acetyl substituents of, for example, N-acetyl-L-3,4-dihydroxyphenylalanine, can be accomplished simply by adjusting the pH of the reaction medium containing N-acetyl-L-3,4-dihydroxyphenylalanine to neutrality, and then contacting this compound with either carboxypeptidase A or acylase. Enzymatic hydrolysis of the N-acetyl substituent will generally be complete within 30 minutes after exposure of this N-acetyl substituted compound to either of the above enzymes. Of course, the use of insolubilized carboxypeptidase A or acylase will expedite their separation from the L-3,4-dihydroxyphenylalanine.

L-3,4-dihydroxyphenylalanine and its N-substituted derivatives can be crystallized from the reaction medium in which they are dissolved by standard chemical techniques; see J. Med. Chem. 14:10, 1021 (1971) for analogous procedures.

The examples which follow further illustrate the preferred reactants and conditions of the process of this invention.

EXAMPLE I

One hundred milligrams of tyrosinase, obtained in the form of a crude lyophilized powder (Worthington Biochemical Company, Freehold, N.J.), is dissolved in 20 milliliters distilled water and then combined with 9.44 grams solid ammonium sulfate. The pH of the resultant solution is adjusted to neutrality with 0.01 N NaOH and mildly agitated at 0° C. for 30 minutes. The suspension thus formed is centrifuged at 30,000 times gravity for 30 minutes at 0° C.; the supernatant discarded; and sufficient 0.01 M phosphate buffer, pH=7, added to redissolve the precipitated material present therein. The solution is then applied to a column (1.5 x 100 cm.) of Sephadex G–50 gel (Aktiebolaget Pharmacia, Upsala Sweden—described in U.S. Pat. 3,042,669) and eluted with 0.01 M phosphate buffer. Those fractions obtained from the void volume having ultraviolet absorption ratios consistent with those accepted for purified mushroom tyrosinase are retained for further use. The specific activities of the highly purified tyrosinase obtained by this technique are 23 mmoles p-cresol converted to catechol per minute per milligrams enzyme and 440 mmoles catechol converted to 4-methyl-1,2-benzoquinone per minute per milligram enzyme—or 19:1 catecholase/cresolase ratio.

To 7.0 milliliters of phosphate buffered aqueous solution, pH=7, containing 20 milligrams of highly purified tyrosinase (obtained as above) are added an equivolume solution containing 0.98 grams acrylamide monomer and 0.051 grams bisacrylamide (Eastman Kodak Company, Rochester, N.Y.). After the two solutions are thoroughly mixed, the mixture is further diluted by the addition of 0.06 milliliters N,N,N',N'-tetramethyl ethylene diamine. The resulting solution is transferred to a petri dish, 100 millimeters in diameter, in order to provide a greater surface area and shallow fluid level for ease of penetration of UV light.

Once transferred, 0.001 grams riboflavin (free radical initiator) is dispersed throughout the solution and the petri dish and its contents irradiated with a Canalco Preparation Light provided with a 14-watt General Electric Daylight Bulb (Rockville, Md.) placed approximately 4 inches from the surface of the fluid in the dish. Ordinarily, 20 minutes of exposure to UV followed by an additional 60 minutes in natural sunlight provides the requisite energy to initiate and promote complete polymerization of the acrylamide monomer.

The hydrogel-enzyme complex thus formed is then cut into pieces approximately 1 centimeter square, loaded into the barrel of a standard 5 milliliter Luer-lock syringe (absent attachments—needles, cannulae, etc.), the plunger reinserted into the syringe barrel, and the hydrogel-enzyme complex crushed by forcing it through the syringe nozzle; it subsequently being collected in a beaker of distilled water. The crushed acrylamide-tyrosinase complex is allowed to settle after collection for about 2 minutes and then the supernatant decanted off. This washing-decantation procedure is repeated with eight 50-milliliter volumes of distilled water. The entire above procedure (dispersement, washing, and decantation) is then repeated to further reduce the size of the gel particles.

One gram of the above hydrogel-enzyme complex is added to 10 milliliters of a saturated aqueous solution of N-acetyl-L-tyrosine, pH 5 (0.1 M acetate buffered) and the vessel containing these materials mildly agitated for about 120 to about 180 minutes while the temperature of the materials contained therein is maintained at a constant 20° C. The hydrogel-enzyme complex is then separated from the supernatant by decantation into an empty beaker. The supernatant is transferred to a stainless steel bomb containing a palladium catalyst on charcoal; the bomb pressurized to 3 atmospheres; and hydrogen gas bubbled through the supernatant for about 3 to 5 hours. After reduction of the substrate oxidation product to the degree desired, the supernatant containing this product is removed from the bomb and placed in a beaker.

Crystallization of L-3,4-dihydroxyphenylalanine is accomplished by the addition of 30 milliliters of n-butylacetate to the supernatant followed by extraction with 30 and then with 10 milliliters of water. The two aqueous extractions are collected in a single vessel, pH adjusted to 5.0 with 25% NH₄OH solution containing minor amounts of NaHSO₃ whereupon crystallization of the desired product occurs. After refrigeration of the supernatant overnight at ~4° C., the crystals are recovered by filtration, washed with distilled water and dried. The crystals thus recovered can be further purified recrystallization in distilled water containing minor amounts of NaHSO₃.

EXAMPLE II 0.1 grams agarose, reagent grade, is added to 50 milliliters distilled water, and allowed to swell for 2 hours with constant agitation. The suspension is permitted to settle for two minutes, the supernatant decanted off and the swollen agarose resuspended in sufficient quantities of distilled water such that total volume of the suspension is 5 milliliters. The pH of the agarose suspension is then adjusted to a pH 11.0 with 0.1 M NaOH. One-tenth of a gram of finely divided cyanogen bromide, reagent grade, is then added to the suspension while the pH is maintained at 11.0 by constant titration with 2.0 N NaOH, and the temperature held at about 20° C. (room temperature) by the addition of ice to the reaction mass as necessary. The reaction is deemed complete when there is no additional base consumed. The suspension is then quickly transferred to a Büchner funnel and washed with equal portions of cold (~4° C.) distilled water and cold (~4° C.) 0.1 M borate buffer, pH 8.5. Washing of the filter cake is performed by aspiration and ordinarily is complete within two minutes.

The activated agarose is transferred from the funnel to a beaker containing five milliliters of a 0.1 M solution of KHCO₃ within which is suspended 0.011 grams highly purified tyrosinase (*Campestris luridus*—catecholase/cresolase activity ratio=19:1). The resulting polymer-enzyme suspension is stirred for 16 to 20 hours at 0° to 3° C. Following formation of an agarose-Tyrosinase conjugate, the supernatant is decanted away and the agarose-Tyrosinase conjugate subjected to repeated washes with alternating solutions of distilled water and 0.1 M KHCO₃.

One gram of the above polymer-enzyme conjugate is added to 10 milliliters of a saturated aqueous solution of N-acetyl-L-tyrosine, pH 5 (0.1 M acetate buffered) and the process of this invention repeated substantially as set forth in Example I.

EXAMPLE III

The process of this invention is repeated substantially as described in Example I, except for the substitution of L-tyrosine for N-acetyl-L-tyrosine as the substrate material. Of course, in the absence of any N-blocking substituent on the substrate materials, hydrolysis of the reduced product is not required.

EXAMPLE IV

The process of this invention is repeated substantially as described in Example I, except for the substitution of N-formyl-L-tyrosine for N-acetyl-L-tyrosine as the substrate material and the hydrolysis of the N-substituent subsequent to reduction by standard synthetic techniques.

EXAMPLE V

The process of this invention is repeated substantially as described in Example I, except for the substitution of N-benzoyl-L-tyrosine for N-acetyl-L-tyrosine on the substrate material and the hydrolysis of the N-substituent subsequent to reduction by standard synthetic techniques.

What is claimed is:

1. A stereospecific process for the preparation of L-3,4-dihydroxyphenylalanine, comprising (a) contacting a sole substrate material of the formula

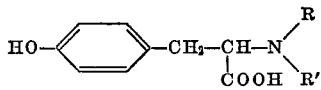

wherein R is hydrogen and R' is selected from the group consisting of —COR" and

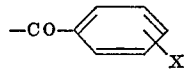

where R" is hydrogen, alkyl of 1 to 3 carbon atoms, or halo substituted alkyl of 1 to 3 carbon atoms; and X is hydrogen or halogen with insolubilized tyrosinase in a reaction medium having a pH in the range of from 4.8 to about 7.3 and temperature in the range of from 5 to about 40° C. until substantially all the substrate material has been oxidized, to form an oxidation product consisting essentially of a mixture of the o-dihydric and corresponding o-quinone of the substrate material; (b) decanting the insolubilized tyrosinase from the reaction medium containing oxidized substrate material; and (c) reducing oxidized substrate material to the corresponding o-dihydric compound which is then hydrolyzed to form the desired L-3,4-dihydroxyphenylalanine.

2. The stereospecific process as defined in claim 1, wherein the substrate material is N-acetyl-L-tyrosine.

3. The stereospecific process as defined in claim 1, wherein the reaction medium has a pH of about 5 and a temperature in the range of about 20° C.

4. The stereospecific process as defined in claim 1, wherein the tyrosinase is insolubilized by entrapment of a polyacrylamide hydrogel.

5. The stereospecific process as defined in claim 1, wherein, the substrate material is N-formyl-L-tyrosine.

6. The stereospecific process as defined in claim 1, wherein, the substrate material is N-benzoyl-L-tyrosine.

References Cited

UNITED STATES PATENTS

| | | | |
|---|---|---|---|
| 3,674,767 | 7/1972 | Lilly et al. | 195—63 |
| 3,386,888 | 6/1968 | Chibata el al. | 195—63 |
| 3,671,397 | 6/1972 | Sih | 195—29 |
| 3,669,837 | 6/1972 | Parcell | 195—29 |

OTHER REFERENCES

Lerner, A. B.; Methods in Enzymology, vol. II, p. 827, Academic Press (1955).

A. LOUIS MONACELL, Primary Examiner

R. J. WARDEN, Assistant Examiner

U.S. Cl. X.R.

195—30